(12) United States Patent
Sekiya et al.

(10) Patent No.: US 7,316,384 B2
(45) Date of Patent: Jan. 8, 2008

(54) ELECTRIC CONTROL VALVE

(75) Inventors: Itaru Sekiya, Saitama (JP); Atsu Kohno, Saitama (JP); Morio Kaneko, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 87 days.

(21) Appl. No.: 10/545,711

(22) PCT Filed: Feb. 13, 2004

(86) PCT No.: PCT/JP2004/001542

§ 371 (c)(1),
(2), (4) Date: Aug. 12, 2005

(87) PCT Pub. No.: WO2004/072523

PCT Pub. Date: Aug. 26, 2004

(65) Prior Publication Data
US 2007/0040138 A1    Feb. 22, 2007

(30) Foreign Application Priority Data
Feb. 14, 2003  (JP) .............................. 2003-037314

(51) Int. Cl.
*F16K 31/12* (2006.01)
(52) U.S. Cl. .................. 251/129.11; 251/208
(58) Field of Classification Search ........... 251/129.11, 251/129.12, 129.13, 208
See application file for complete search history.

(56) References Cited

U.S. PATENT DOCUMENTS 3,987,819 A * 10/1976 Scheuermann ........... 137/637.3
4,366,947 A * 1/1983 Voege ........................ 251/206
4,380,250 A * 4/1983 Stoll ........................... 137/556
4,887,793 A   12/1989 Hernandez et al.
4,964,433 A   10/1990 Marietta
5,069,249 A * 12/1991 Ostertag et al. .......... 137/625.4
5,308,040 A *  5/1994 Torres ........................ 251/208
5,664,761 A *  9/1997 Weyand et al. ............ 251/283
5,842,680 A * 12/1998 Bustamante et al. ......... 251/65
6,926,250 B1 * 8/2005 Hashimoto et al. .... 251/129.11

FOREIGN PATENT DOCUMENTS

| CN | 1331393 | 1/2002 |
|----|---------|--------|
| CN | 1388876 | 1/2003 |
| JP | 11-248021 | 9/1999 |
| JP | 2001-187977 | 7/2001 |
| JP | 2001-317839 | 11/2001 |
| JP | 2001-325651 | 11/2001 |
| JP | 2002-349744 | 12/2002 |

* cited by examiner

Primary Examiner—Gregory Huson
Assistant Examiner—John K. Fristoe, Jr.
(74) Attorney, Agent, or Firm—Reising, Ethington, Barnes, Kisselle, P.C.

(57) ABSTRACT

The electric control valve, in which a throttled flow rate is quantitatively determined by the groove 16 by a rotating position of the valve body 20, the valve seat surface projects like a band from a border band 16C drawing an outline of the groove 16, and the end surface of the valve body 20 contacts slidingly on a top surface of the border band 16C.

10 Claims, 9 Drawing Sheets

ELECTRIC CONTROL VALVE

REFERENCE TO RELATED APPLICATIONS

This application claims the benefit of Japanese Patent Application No. 2003-037314 filed on Feb. 14, 2003, and to Japanese PCT Application No. PCT/JP2004/001542 filed on Feb. 13, 2004.

BACKGROUND OF THE INVENTION

1. Field of the Invention

This invention relates to an electric control valve, especially, the electric control valve used as an electric expansion valve and a flow control valve for a freezing chamber and a refrigerating chamber.

2. Description of the Related Art

As the electric control valve used as the electric expansion valve and the flow control valve at a coolant flow path of the freezing/refrigerating chamber, a one-revolution type electric control valve, which includes a groove extending in a circular arc shape in a rotating direction of the valve body on a slid-contact surface (an end surface) opposing to a valve seat surface of the valve body, and changing gradually one of a width and a depth of the groove or both of the width and the depth thereof in an extending direction, and determines a throttled flow rate quantitatively by the groove by a rotating position of the valve body to be rotated to a predetermined rotating position by a stepping motor, is known, as shown in Japan Patent Application Laid Open No. 2001-187977 and Japan Patent Application Laid Open No.2002-317880.

DISCLOSURE

There is a drawback that, according to the above electric control valve, a frictional drag of rotating of the valve body is large since the valve body rotates in a condition that the end surface of the valve body contacts with the flat valve seat surface, and when the valve body has a larger outer diameter, an area of contact surface thereof becomes larger and a driving torque of the valve body increases.

To overcome the above drawback, one object of this invention is to provide an electric control valve, in which the driving torque of the valve body can be reduced, and valve leakage is prevented by high flatness of the valve seat surface.

In order to attain the objects, an electric control valve according to the present invention, in which a valve chamber has a flat valve seat surface, and a groove for setting a throttled flow rate variably is formed on the valve seat surface, and a valve body, an end surface of which opposes to the valve seat surface, is arranged rotatably in the valve chamber, and the valve body is rotated by an electric actuator to a predetermined rotating position, and the rotating position determines the throttled flow rate quantitatively by the groove, is characterized in that the valve seat surface projects like a band from a border band drawing an outline of the groove, and the end surface of the valve body contacts slidingly on a top surface of the border band.

DESCRIPTION OF THE PREFERRED EMBODIMENT

Physical structure of an electric control valve according to a first embodiment of the present invention:

The structure of the electric control valve according to the first embodiments of the present invention will be described with reference to FIGS. 1-8 hereafter.

Figure 1:
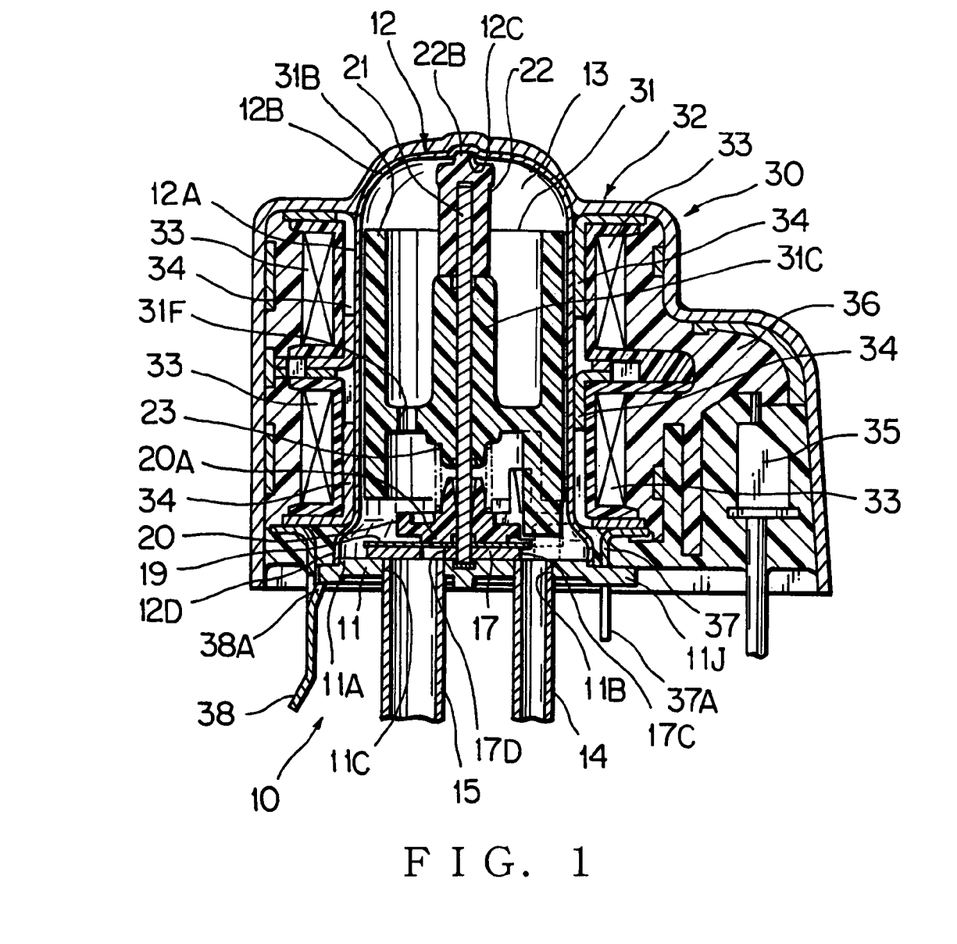
FIG. 1 is a cross-sectional view of a first embodiment of an electric control valve according to this invention.

As shown in FIG. 1, an electric control valve 10 includes a disk-shape bottom cover 11 as a fixed-side member, and a can-shape case 12 welded airtightly with the bottom cover 11. The case 12 and the bottom cover 11 form an airtight valve chamber 13 inside thereof in cooperation with each other.

Figure 3:
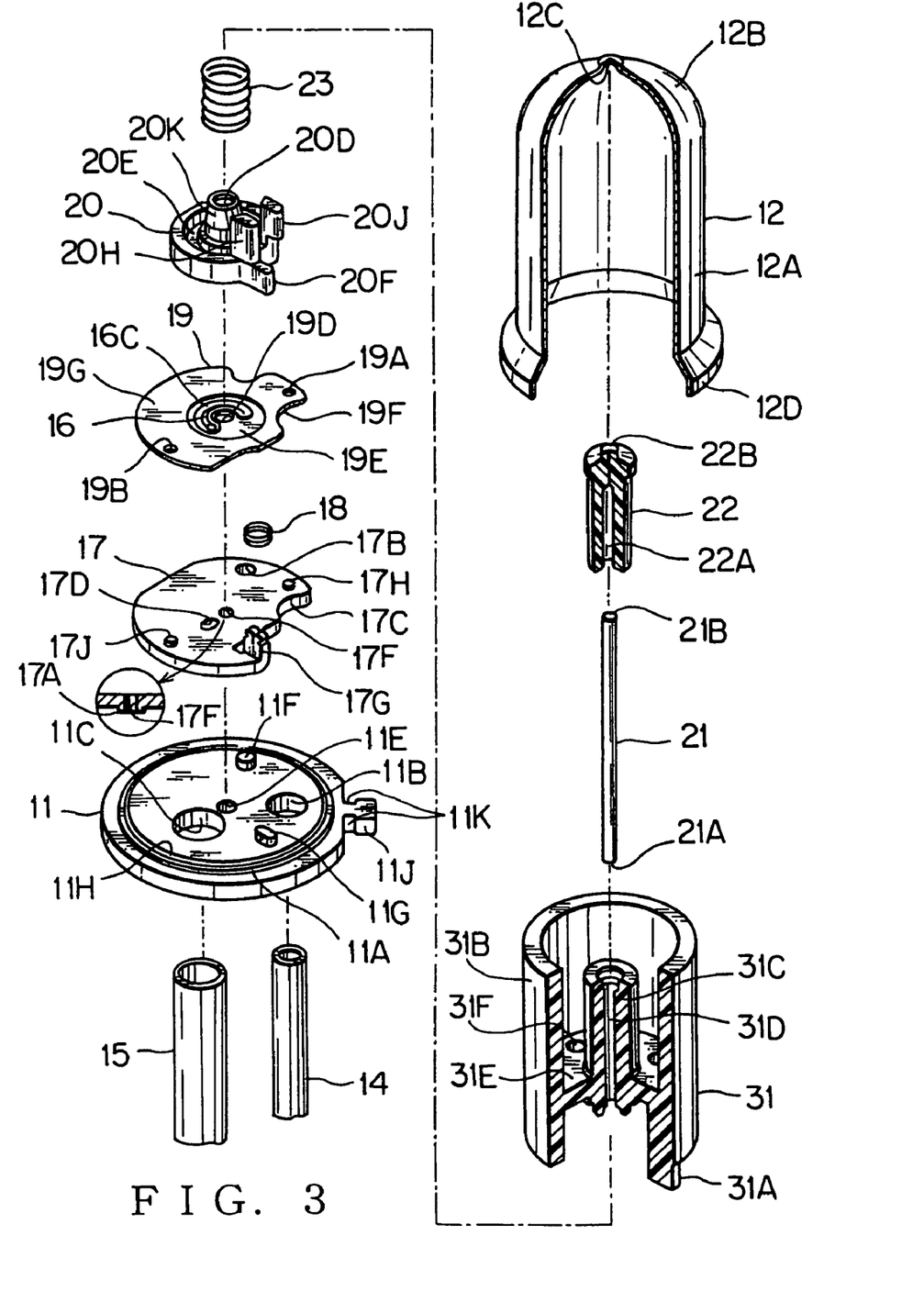
FIG. 3 is an exploded perspective view of main part of the electric control valve of the first embodiment.

The case 12 is formed by deep drawing a stainless steel sheet. As shown in FIG. 3, a top dome portion 12B of the case 12 is formed by pressing simultaneously with a rotor-receiving cylindrical portion 12A for having securely coaxiality of the rotor receiving cylindrical portion 12A and a bearing engaging dent 12C formed in a center of the top dome portion 12B. When a joining area between the top dome portion 12B and the rotor receiving cylindrical portion 12A can be defined as a spherical surface, the top dome portion B is formed so that a curvature (R) of the spherical surface is to be slightly smaller than a half value of an outer diameter (D) of the rotor receiving cylindrical portion 12A, that is R=(D/2)−a. This design is for improving inner pressure resistance to insure a required pressure resistance by suitably limiting a curvature of the top dome portion 12B without enlarging a vertical dimension of the case over the necessity.

A bottom opening portion 12D of the case 12 to be joined with the bottom cover 11 has a larger diameter than the outer diameter (D) of the rotor receiving cylindrical portion 12A to have a design margin of inner components, and to consider pressure resistance, and to decrease thermal effects when joining.

The bottom cover 11 is formed by pressing and punching the stainless steel sheet. A step portion 11A having an outer diameter almost same as an inner diameter of the bottom opening portion 12D of the case 12 is formed on a upper surface of the bottom cover 11. The bottom opening portion 12D of the case 12 fits to the step potion 11A (refer FIG. 1). By the fitting, coaxiality of the bottom cover 11 and the case 12 is insured.

Welding of the bottom cover 11 and the case 12 is acted at a fitting area of the step portion 11A and the bottom opening portion 12D. Thereby, thermal effect by welding is decreased, and scattering of spatters into a valve chamber 13 and solder flowing to a welding area can be prevented.

The bottom cover 11 is provided at required positions (two positions) respectively with each through hole 11B or 11C for inserting a pipe joint, having a brazing space, being formed by punching. One end of each pipe joint 14, 15 is inserted respectively into the through hole 11B or 11C. The pipe joints 14, 15 are fixed on the bottom cover 11 and a middle plate 17, which are integrated together by a later-described connection, and extend to an outside (downward) of the bottom cover 11.

This brazing is preferably acted by fluxfree brazing in a furnace, for example a hydrogen reduction atmospheric furnace, in the same process as a later-described brazing of the middle plate 17.

A ring U-section groove 11H having a diameter smaller than that of the step portion 11A is provided at a upper surface of the bottom cover 11 for preventing brazing material for brazing the pipe joints 14, 15 and the middle plates 17 from flowing to a welding surface of the bottom cover 11 and the case 12.

The middle plate (a base plate) 17 is fixed on the upper surface of the bottom cover 11 by brazing. The middle plate 17 is formed by pressing and bending and punching stainless steel sheet.

A shaft-supporting hole 17F is formed at a center of the middle plate 17 by punching. The middle plate 17 at a bottom surface thereof has an annular projection 17A around the shaft-supporting hole 17F, which is formed by durring process when the shaft-supporting hole 17F is punched. The annular projection 17A fits into a central hollow 11E embossed at a center area of the bottom cover 11. A positioning hole 17B to fit into a positioning projection 11F embossed at the bottom cover 11 is formed by punching at the middle plate 17. Fitting the two positions make coaxial positioning of the middle plate 17 and the bottom cover 11.

The central hollow 11E of the bottom cover 11 has a depth enough to stock the brazing material for preventing the brazing material from flowing to the shaft-supporting hole 17F. The central hollow 11E also performs to absorb dispersion of a shaft length of later-described center shaft 21.

A cutout 17C to open a through hole (inlet port) 11B into a valve chamber 13 is formed at the middle plate 17. An oval 15 connecting hole (communication hole) 17D to communicate with a through hole (outlet port) 11C is formed at the middle plate 17. The connecting hole 17D communicates at a longer radius direction and an outside in radius with the through hole 11C.

A stopper 17G, on which a stopper 20F of a later-described valve body 20 abuts for initializing a start point, is formed by bending at the middle plate. A damping coil spring 18 is mounted around the stopper 17G on the stopper 17G. The damping coil spring 18 is made of an elastic stainless steel wire so as to be wound into usual coil shape in near solid coiling.

A top end of the stopper 17G is deformed by caulking for preventing drop of the damping coil spring 18. A projection 11G is embossed on a upper surface of the bottom cover 11. A top end of the projection 11G abuts on a bottom end of the damping coil spring 18 mounted on the stopper 17G to prevent the damping coil spring 18 from tilting.

A valve seat (valve seat member) 19 is mounted on the upper surface of the middle plate 17. The valve seat 19 is a stainless steel thin sheet formed into a required shape by both-sides etching process. The valve seat 19 is processed by barreling to remove corner edges by both-side etching process, and to improve smoothness and surface roughness of a slide valve seat surface for having sliding-lubricity of the valve body 20.

In the valve seat 19, positioning holes 19A, 19B to fit respectively to two positioning bumps 17H, 17J embossed at the middle plate 17, a full-open port 19C communicating with the connecting hole 17D, and a center hole 19D, through which the center shaft 21 penetrates, are formed to pass through the valve seat 19 by etching process. The fill-open port 19C deviates from the center of the through hole 11C of the bottom cover 11 (pipe joint 15) toward a rotating center of the valve body 20.

Figure 4:
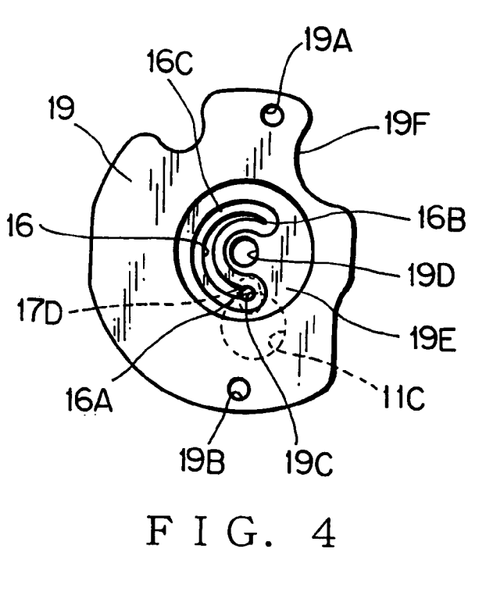
FIG. 4 is an expanded plan view of a valve seat of the electric control valve of the first embodiment.
Figure 5:
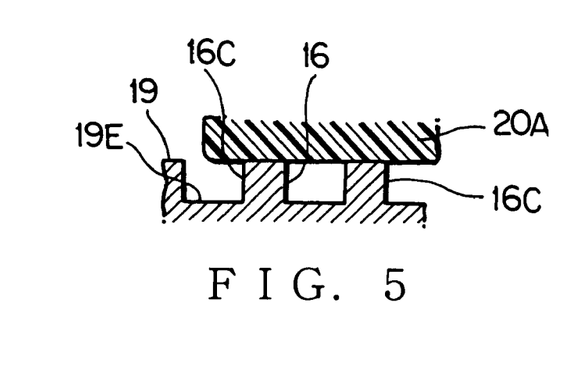
FIG. 5 is an expanded cross-sectional view of a valve body and a groove of the electric control of the first embodiment.

A groove 16 for setting a throttled flow rate variably is formed by half-etching process on a valve seat surface 19G. As shown in FIG. 4, the groove 16 extends in a circular arc shape in a rotating direction of the valve body 20, that is, extends within a rotating range of 270 degree around a center axis, with a constant depth and a groove width being changed gradually in an extending direction. The groove 16 communicates at a maximum width portion 16A of one end thereof (the maximum width side) with the full-open port 19C, the width of the groove is decreasing gradually by moving clockwise in the figure, and the other end thereof is a minimum width portion 16B.

Instead of the width of the groove, or together with the width of the groove, the depth of the groove is changed gradually in the extending direction, a maximum depth portion of one end thereof (maximum depth side) when the width is constant, and a maximum width and maximum depth portion of one end (maximum width and depth side) when the width and the depth are changed gradually in the extending direction can be communicated to the full-open port 19C.

As shown in FIG. 3, a central portion (circular portion having the same outer diameter of a flat valve portion 20A) of the valve seat surface 19G, which the flat valve portion 20A of the valve body 20 opposes actually, is formed by half-etching process to have a depression 19E (see FIG. 5) with the same depth as the groove 16 remaining a band with predetermined width of a border band 16C drawing an outline of the groove 16. Thus, the border band 16C drawing an outline of the groove 16 is formed into a band-like projection.

A bore diameter of the full-open port 19C of the valve seat 19 is a diameter to insure the maximum flow rate used for a system (for example 0.8 mm diameter). A dimension of the groove 16 setting a throttled flow rate variably is 0.1 mm or less by being converted into a port diameter in a usual valve shape. These dimensions are very small. However, forming them by etching process can perform accuracy of dimension in micron level. The etching process can give freedom of design and strange shape design, and realize accuracy of dimension of components, flatness and surface roughness in low cost, and decrease leakage of valve.

The valve seat 19 is aligned in a position and an angle by fitting the positioning holes 19A, 19B respectively with the positioning bumps 17H, 17J of the middle plate 17. The valve seat 19 is joined to the middle plate 17 by an adhesive/a sealant, brazing, soldering, thermo-compression bonding, welding and the like.

As the adhesive/sealant, epoxy, polyamide-imide, polyester, polyester imide and polyurethane adhesive/sealant are suitable about durability against a coolant. Curing of the adhesive or the sealant can be done in a batch or continuous furnace. The adhesive/sealant by thermoset resin such as epoxy resin is cured by heating in 120 degree C.

In the valve seat 19, a cutout 19F for opening the through hole (inlet port) 11B to the valve chamber 13 is formed as same 20 as the cutout 17C of the middle plate 17.

Figure 2A:
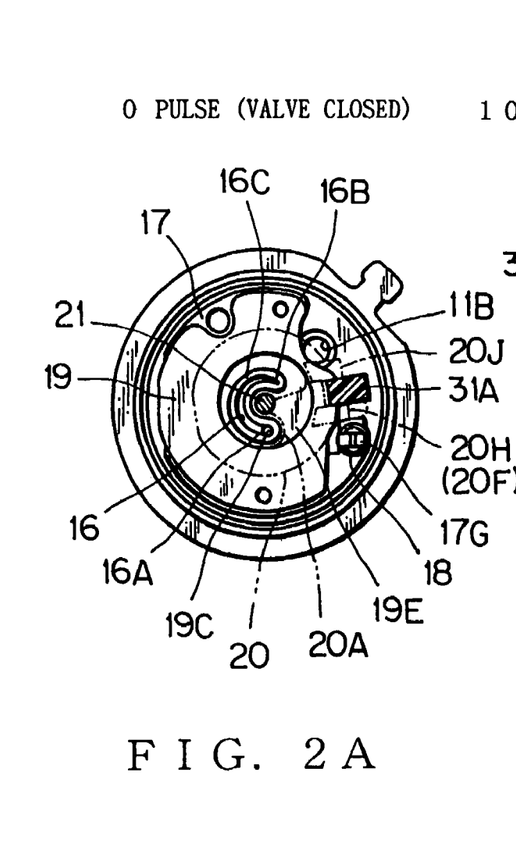
FIG. 2A, 2B and 2C are illustrations showing respective acting conditions of the electric control valve of the first embodiment.
Figures 2B, 2C:
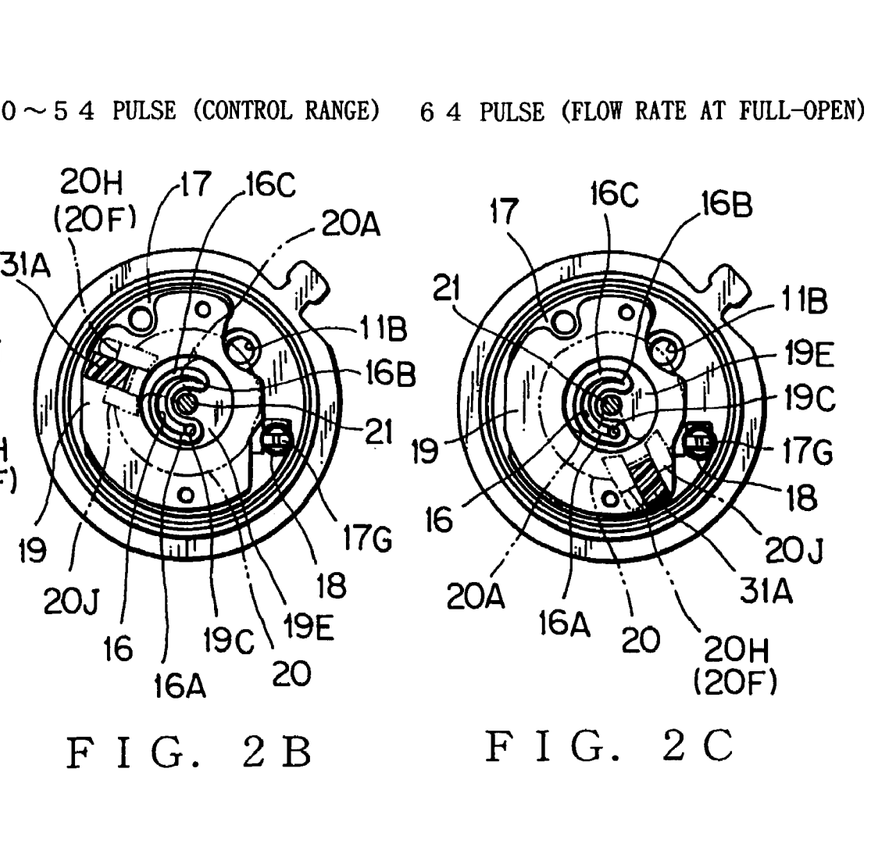

The valve seat surface 19G is the upper surface of the valve seat 19 in the valve chamber 13. The valve body 20 is arranged on the valve seat surface 19G. The valve body 20 is formed as one piece with a resin material by considering slidability and durability against the coolant. A shown in FIG. 2, the C-shape flat valve portion 20A is formed profectingly on a bottom surface of the valve body 20. The flat valve portion 20A of the valve body 20 contacts slidingly only on a flat upper surface of the border band 16C of the groove 16. This results a small contact surface of the valve body 20 and the valve seat surface 19G.

Figure 7A:
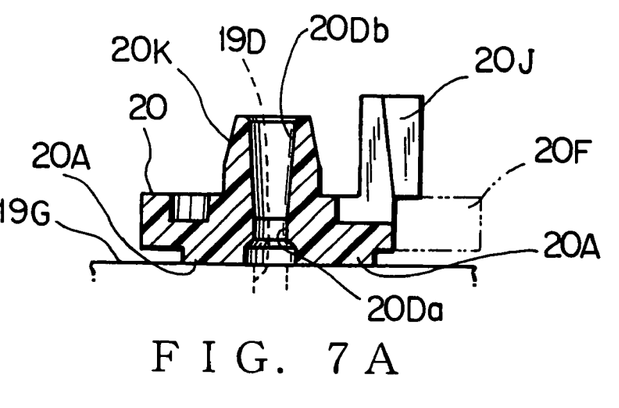
FIG. 7A is an expanded cross-sectional view of the valve body of the first embodiment.
Figure 7B:
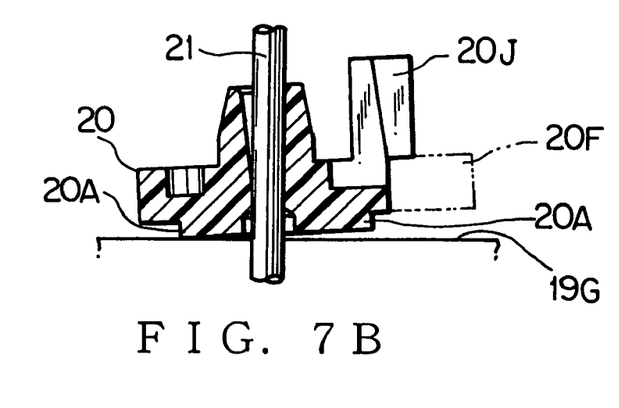
FIG. 7B is an expanded cross-sectional view showing swiveling action of the valve body of the first embodiment.

At a center area of the valve body 20, a center hole 20D, through which the center shaft 21 penetrates rotatably, is formed passing through. A rotating center of the valve body 20 is defined by the center shaft 21, which guides the valve body 20 to rotate around a center axis of the center shaft 21. As shown in FIG. 7A, 7B, the center hole 20D has a fitting straight hole portion 20Da (small clearance) for maintaining coaxiality with the center shaft 21 and a top tapered hole portion Db.

The top tapered hole portion 20Db has a structure to improve efficiency of assembling the center shaft 21 and acts as a swivel mechanism to absorb dispersion of parallelism and rectangularity of the valve seat 19 and valve body 20 against the center shaft 21. Thereby, sealing and stability of action as a flow control valve can be improved. The swivel mechanism can reduce possibility of locking the valve body 20 caused by clamping dusts.

As shown in FIG. 3, two projections 20H, 20J are integrally formed with a small interval in a circumferential direction of the valve body 20 to project outwardly in a radial direction of the valve body 20. The projection 20H is arranged at the same position in the circumferential direction as the stopper 20F. A projection 31A provided at a rotor 31 of a stepping motor 30 engages between the two projections 20H, 20J as shown in FIG. 2. Thereby, the two projections 20H, 20J and the rotor 31 are connected together to transmit torque in a condition to position them in a rotating direction so as to rotate the valve body 20 and the rotor 31 synchronously.

Figure 6:
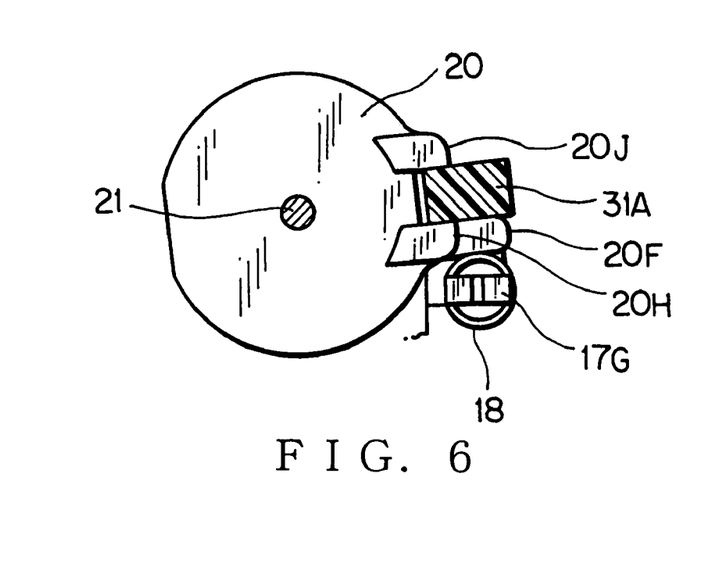
FIG. 6 is an expanded plan view of a stopper for initializing a start point of the electric control valve of the first embodiment.

The stopper 20F of the valve body 20, as shown in FIG. 2A and FIG. 6, abuts on the damping coil spring 18 of the stopper 17G for initializing a start point by a rotation toward the start point (CW) of the rotor 31.

A shock by an impact of abutting for initializing the start point is absorbed by the damping coil spring 18 and a sound by an impact noise is reduced. The damping coil spring 18 is made of metal not to be affected by coolants and refrigerating machine oils, so as to have better durability than a damping material of a rubber elastic body (rubber stopper).

The projections 20H, 20J are formed at an upper side of the stopper 20F of the valve body 20. The projection 31A engages with the projections 20H, 20J when the rotor 31 is assembled to the valve body 20. As shown in FIG. 3, the valve body 20 has a taper guide shaft portion 20K for a later-described pressing spring 23.

The center shaft 21 is made of a ground stainless steel. A bottom end 21A of the center shaft 21 is supported rotatably with the middle plate 17 by fitting the bottom end 21A into the annular projection 17A. A top end 21B of the center shaft 21 fits rotatably with a bearing hole 22A of a bearing 22. The bearing 22 is made of high lubricating resin material, and a top center projection 22B of the bearing 22 engages with the bearing engaging dent 12C (FIG. 1).

As shown in FIG. 1, the rotor 31 of the stepping motor 30 is arranged rotatably in the valve chamber 13. The rotor 31 is a plastic magnet, an outer wall 31B of which is magnetized in multiple, and rotate the valve body 20 by transmitting torque with the projection 31A and the valve body 20 to be connected therebetween, as mentioned above.

As shown in FIG. 3, a through hole 31D for passing the center 10 shaft 21 therethrough is provided at a boss 31C of the rotor 31. A rib 31E connecting the outer wall 31B and the boss 31C is provided with a communication hole 31F for equalizing pressure. A length in an axial direction of the through hole 31D is elongated as long as possible to prevent the rotor 31 from shaken rotation (rattling, tilting). At least one communication hole 31F is provided enough to balance pressures at an upper area and a lower area of the rotor 31. The communication hole 31F also prevents from storing the coolant or the refrigerating machine oils on the upper area.

The pressing spring 23 of a compression coil spring is clamped between a bottom end of the boss 31C of the rotor 31 and a top surface of the valve body 20. The pressing spring 23 maintains stability of valve sealing in a low differential of pressure by pressing the flat valve portion 20A to the upper surface of the border band 16C. The pressing spring 23 pushes simultaneously the rotor 31 and the bearing 22 upwardly, and pushes the top center projection 22B of the bearing 22 toward the bearing engaging dent 12C of the case 12.

On an outer wall of the case 12, as shown in FIG. 1, a stator assembly 32 of the stepping motor 30 is positioned and fixed. The stator assembly 32 includes a stator coil 33 forming upper/lower tiers, a plurality of magnetic pole teeth 34 and an electric connector portion 35, and is sealed liquid-tightly by a sealing resin 36.

The stator assembly 32 is arranged for phase matching (mounting position in a circumferential direction) by engaging a Y-shape end 37A of a positioning piece 37 with a recess 11K of a positioning projection 11J formed on an outer wall of the bottom cover 11 to be clamped thereby. The stator assembly 32 is prevented from falling out by engaging a locking hook 38A of a locking piece 38 provided at the stator assembly 32 with a bottom wall of the bottom cover 11.

Figure 8:
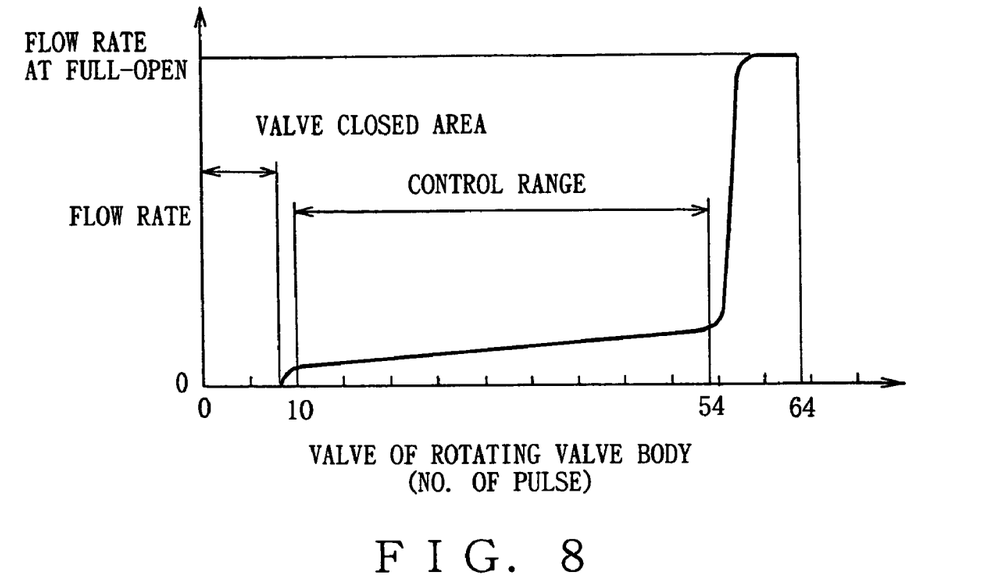
FIG. 8 is a graph showing relation of values of rotating the valve body and flow rates of the valve body of the first embodiment.

The valve body 20 is rotated between a complete-close position (0 pulse=start point) where the whole groove 16 and a full-open port 19C is closed by the flat valve portion 20A as shown in FIG. 2A, a control range (10-54 pulses) where the valve body 20 rotates counter-clockwise from the complete-close position so as to determine throttled flow rate in a determinate quantity by the groove 16 corresponding to a rotating position of the valve body 20 a shown in FIG. 2B, and a full-open position (64 pulses) where the full-open port 19C is opened. One example of characteristics of valve body rotation (number of pulses) and the flow rate is shown in FIG. 8.

During the rotation, the flat valve portion 20A of valve body 20 contacts slidingly only on the upper surface of the border band 16C around the groove 16, and the contact area is small. Thereby, frictional drag of the valve body 20 in rotation is reduced, and a required torque for rotating the valve body 20 is reduced.

It is limited in dimension to move the pipe joint 15 toward the center of the valve body. The full-open port 19C deviates from the center of the through hole 11C toward a rotating center of the valve body 20, so that the outer diameter of the valve body 20 can be decreased accordingly. Thereby, the required torque for rotating the valve body 20 is reduced.

Therefore, a rear-earth magnet, such as a neodymium iron magnet, which has a strong magnetic force and an expensive cost, is not required to be used for a magnet of the rotor 31 of the stepping motor 30. Low cost magnet such as a ferrite magnet can be used for the stepping motor 30.

A bias value of the full-open port 19C toward the rotation center can be designed with large freedom to be a suitable value or a required value without limitation of the communication hole 17D of the middle plate 17.

As shown in FIG. 6, when the projection 31A provided at a rotor 31 of a stepping motor 30 engages between the two projections 20H, 20J for connecting the two projections 20H, 20J and the rotor 31 to transmit torque, a looseness between the two projections 20H, 20J and the projection 31A can be eliminated by a spring.

Figure 9:
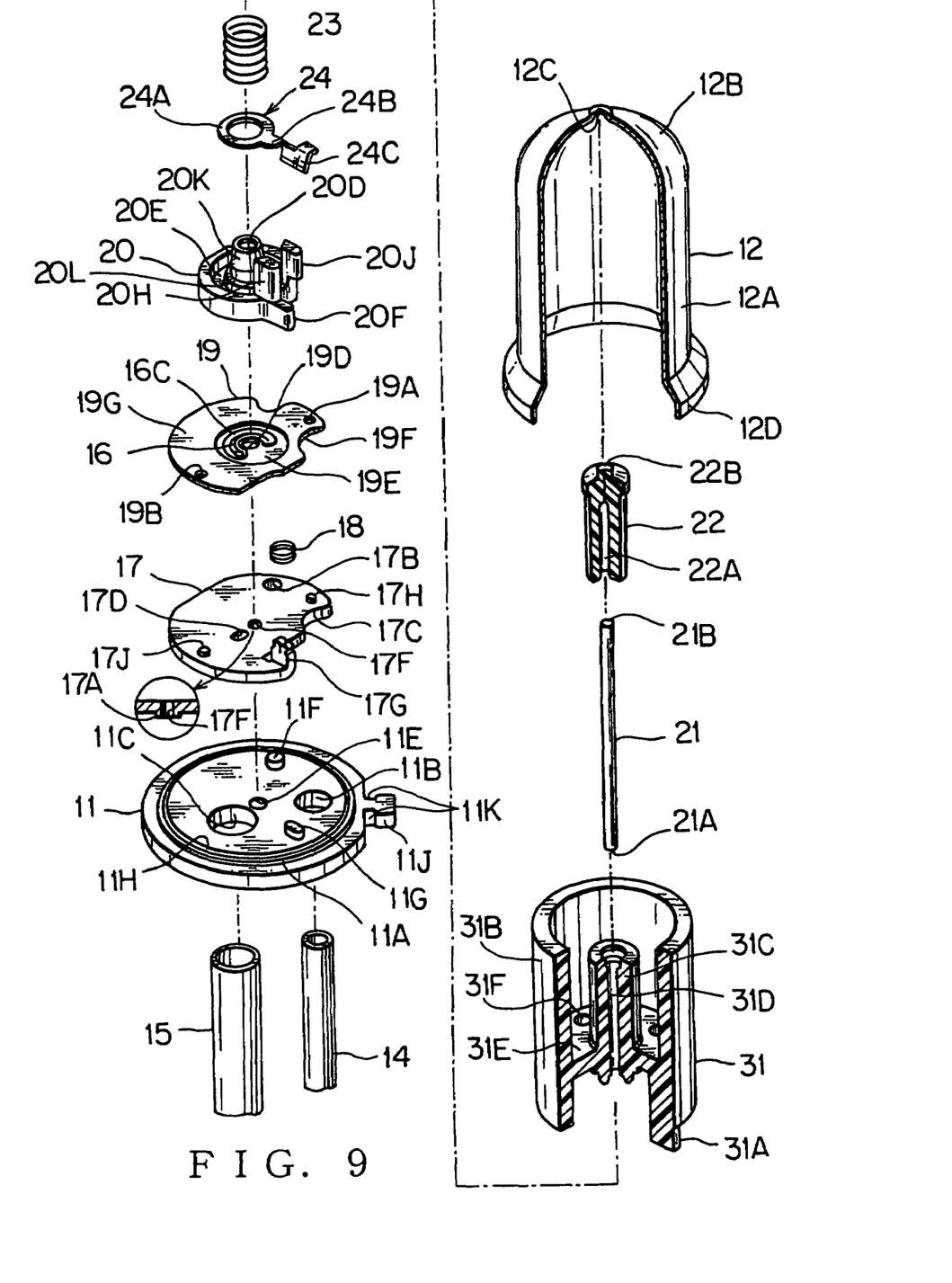
FIG. 9 is an exploded perspective view of main part of the electric control valve according to a modification of the first embodiment.
Figure 10:
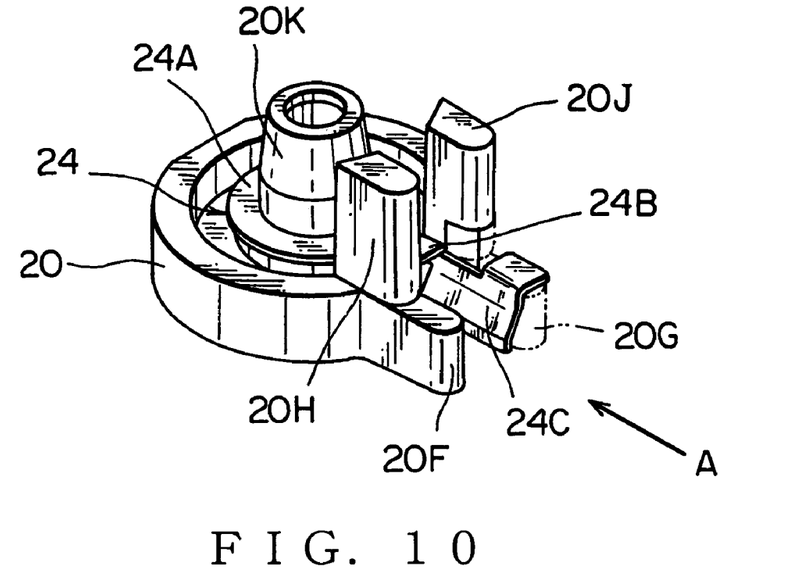
FIG. 10 is an expanded perspective view of a condition of mounting a flat spring on the valve seat in FIG. 9.

As shown in FIG. 9, the projection 31A of the rotor 31 is extended to reach through the two projections 20H, 20J to a height of the stopper 20F. A ring portion 24A of a flat spring 24 to be provided between the valve body 20 and the pressing spring 23 is mounted on the taper guide shaft portion 20K to abut on a step portion 20L at a foot end thereof Thereby, an extending portion 24B extending radially from the ring portion 24A is arranged between the two projections 20H, 20J of the valve body 20 as shown in FIG. 10. Thus, a spring portion 24C formed by bending at a front end of the extending portion 24B is arranged to oppose to the stopper 20F with a gap in a circumferential direction.

In a condition of mounting the flat spring 24 in the valve body 20, the projection 31A of the rotor 31 of the stepping motor 30 is inserted between the two projections 20H, 20J of the valve body 20 and engaged therewith. Thus, a front end of the projection 31A of the rotor 31 passing between the two projections 20H, 20J is inserted between the stopper 20F and the spring 24C, and the projection 31A of the rotor 31 is pushed to an inner side wall of the stopper 20F by the spring 24C. Thereby, looseness between the two projections 20H, 20J and the projection 31A is eliminated so that the valve body 20 and the rotor 31 can synchronously rotate securely, and sound noise by the looseness is reduced.

Figure 11:
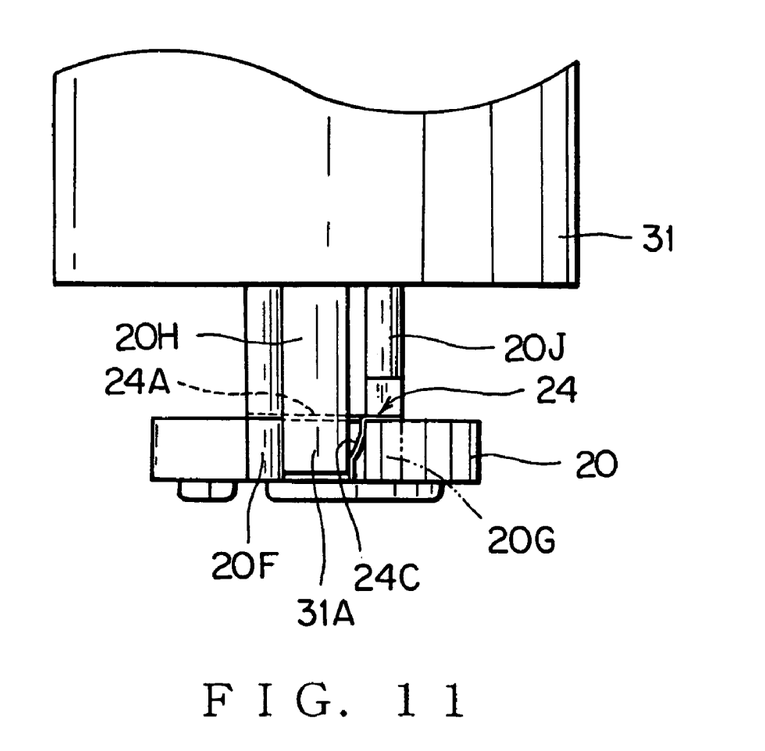
FIG. 11 is an expanded front view from an arrow A in FIG. 9 of a condition of connecting the valve body with a rotor of a stepping motor for transmitting torque.

For eliminating the looseness between the two projections 20H, 20J and the projection 31A with the spring 24C of the flat spring 24, a stopper piece 20G projecting from the stopper 20F with a small width in a circumferential direction can be formed integrally for arranging the spring 24C along an inner side wall of the stopper piece 20G as shown by alternate long and two short dashes lines in FIGS. 10, 11.

In this case, by engaging the projection 31A of the rotor 31 of the stepping motor 30 between the two projections 20H, 20J in a condition of mounting the flat spring 24 on the valve body 20, the projection 31A of the rotor 31 is pushed to the inner side wall of the stopper 20F by the spring 24C as shown in FIG. 11.

Physical Structure of an Electric Control Valve According to a Second Embodiment of the Present Invention An electric control valve according to the second embodiment of the present invention is described with reference to FIGS. 12A, 12B, 12C and 13. Parts in FIGS. 12A-12C corresponding to FIGS. 2A-2C are put with the same markings and explanation will be omitted.

Figure 12A:
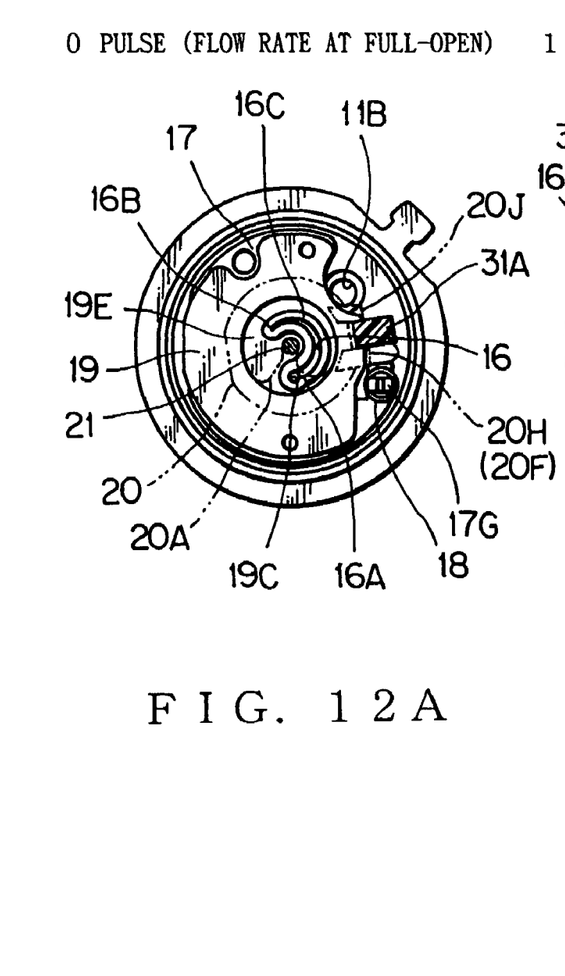
FIG. 12A, 12B and 12C are illustrations showing respective acting conditions of the electric control valve of a second embodiment.
Figure 12B:
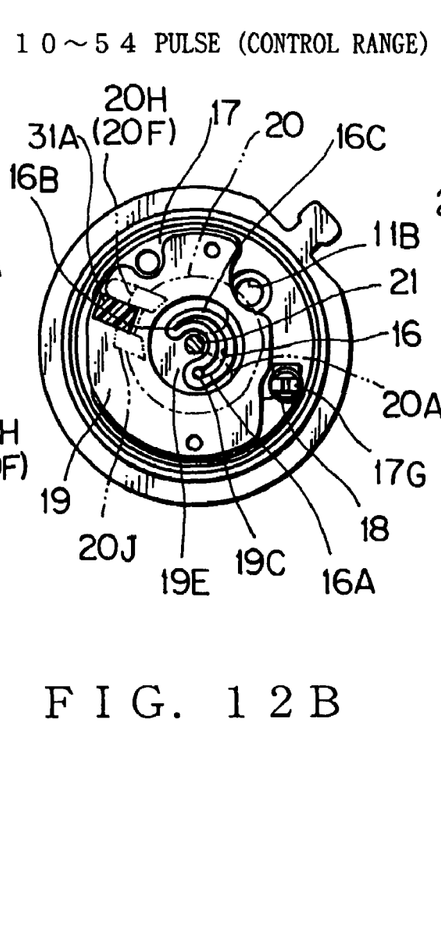
Figure 12C:
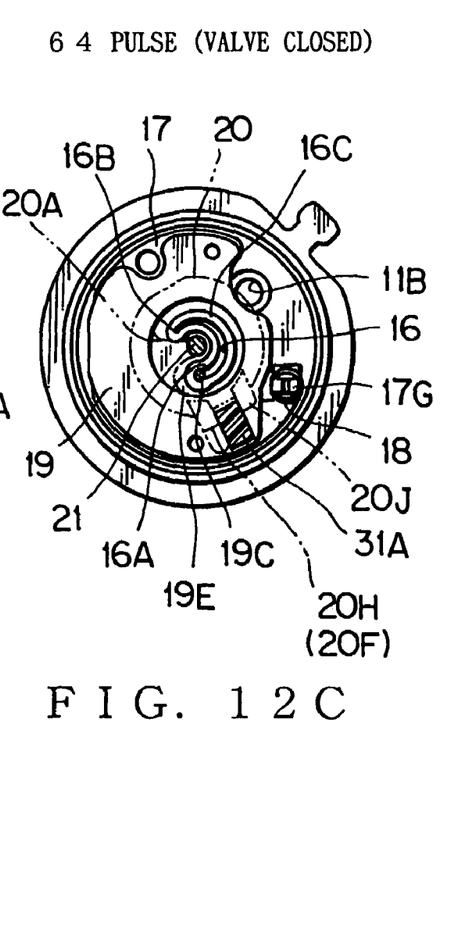
Figure 13:
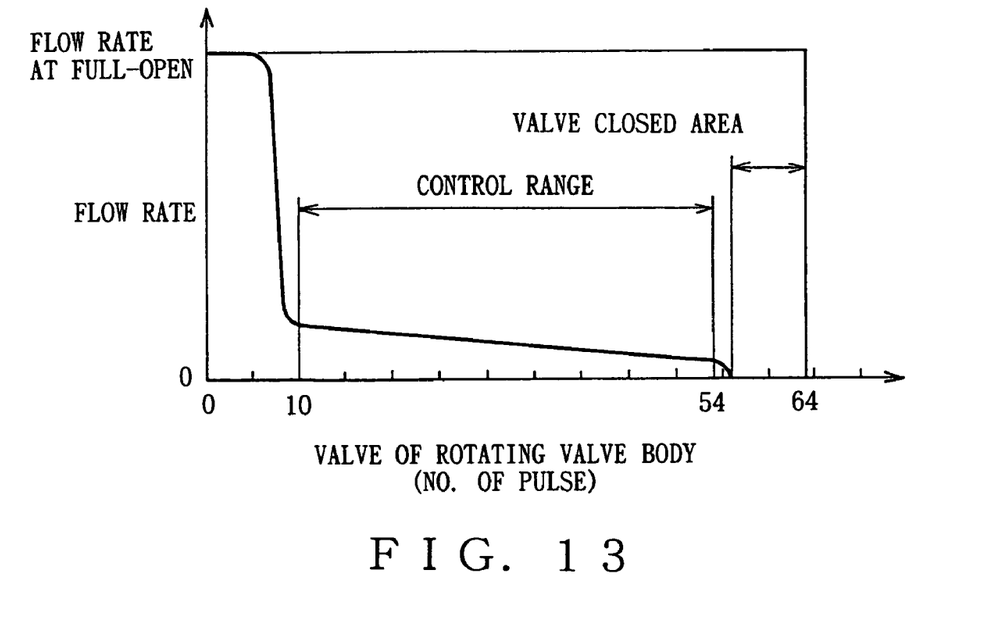
FIG. 13 is a graph showing relation of values of rotating the valve body and flow rates of the valve body of the second embodiment.

A different point between the second embodiment and aforesaid first embodiment is the opposite of characteristics of values of rotating valve body (number of pulses) and flow rate, clearly by comparing FIG. 13 showing the characteristics of values of rotating valve body (number of pulses) of the electric control valve in FIG. 12 and the flow rate and FIG. 8 showing the characteristics of the electric control valve of the first embodiment. So that as shown in FIG. 12A, the full-open port 19C is opened to be in a full-open condition by 0 pules, and as shown in FIG. 12B, the valve body is in a control range to determine throttled flow rate in a determinate quantity by the groove 16 by 10-54 pulses, and a complete-close position where the whole groove 16 and a full-open port 19C are closed is given by 64 pulses, the groove 16 of the valve seat 19, a position of the full-open port 19C and the flat valve portion 20A of the valve body 20 are designed.

When a full-open condition is set periodically for cleaning to discharge dusts stocked inside the valve, and when initializing (setting the start point) is acted periodically for eliminating aged deterioration of the characteristics of value of valve rotating and flow rate, in this embodiment, setting start point and full-open condition are given simultaneously by 0 pulses so that the initializing and cleaning can be acted simultaneously.

Thereby, for example, in usage in a refrigerator, frequency of occasion when temperature in the refrigerator during initializing and cleaning are different from a control target temperature is reduced and the temperature in the refrigerator becomes stable.

In the second embodiment, the flat valve portion 20A of valve body 20 contacts slidingly only on the upper surface of the border band 16C around the groove 16, as same as the first embodiment, and the contact area is small. Thereby, in this embodiment, frictional drag of the valve body 20 in rotation is reduced, and a required torque for rotating the valve body 20 is reduced.

In the electric control valve of the second embodiment, the looseness between the two projections 20H, 20J and the projection 31A is eliminated by the spring 24C of the flat spring 24 provided between the valve body 20 and the pressing spring 23 as same as the electric control valve of the first embodiment Thereby, the valve body 20 and the rotor 31 can synchronously rotate securely, and sound noise by the looseness is reduced.

Example of Using the Electric Control Valve of the First and Second Embodiments According to the Present Invention An example of using the electric control valve of the first and second embodiments according to the present invention is described with reference to FIG. 14.

Figure 14:
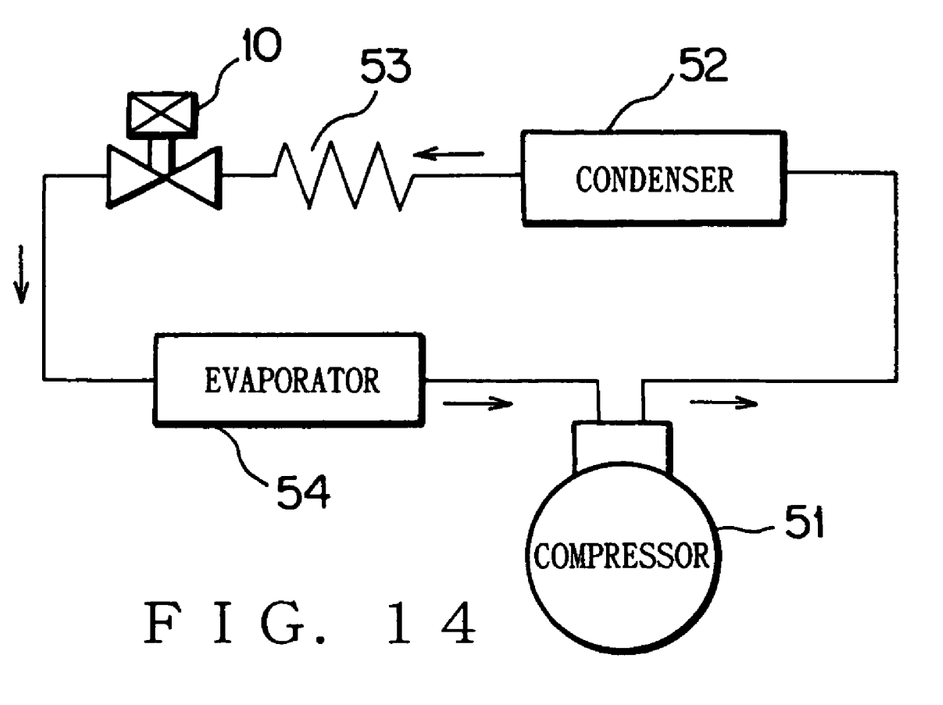
FIG. 14 is a coolant circuit diagram showing an example of usage of the electric control valve according to the present invention.

FIG. 14 shows a coolant circuit of a refrigerator in the example of using the electric control valve of the first and second embodiments according to the present invention. The coolant circuit of a refrigerator includes a compressor 51, a condenser 52, a capillary tube 53 and an evaporator 54. The electric control valve 10 is provided between the capillary tube 53 and the evaporator 54 to perform as variable throttling electric control expansion valve for adjusting (controlling) temperature in the refrigerator in a control range.

INDUSTRIAL USABILITY

As understood by the aforesaid description of the first and second embodiments, in the electric control valve according to the present invention, a border band drawing the outline of the groove projects like a band, and an end surface of a valve body contacts slidingly on an upper surface of the border band. The valve body contacts slidingly only on the upper surface of a border band around the groove, and the contact area is a small, so that frictional drag of the valve body in rotation is reduced, and a required torque for rotating the valve body can be reduced.

As a detailed structure example, the groove extends in a circular arc shape in a rotating direction of the valve body, and one of a width of the groove and a depth of the groove or both of the width and the depth thereof changes gradually in an extending direction, and the groove communicates at a side of a maximum dimension of one or both of the width and depth thereof to a full-open port formed on the valve seat surface.

Furthermore, the full-open port can be biased from a center of a joint for connecting with an outside toward a rotation center of the valve body, so that an outer diameter of the valve body can become smaller and thereby the driving torque required for rotating the valve body could be reduced.

When a bottom portion of the valve chamber is formed with a structure stacked by a bottom cover to be connected with the joint, a valve seat having the valve seat surface formed with the groove and the full-open port, and a middle plate being provided between the bottom cover and the valve seat and having a communication hole for communicating the joint and the full-open port, a bias value of the full-open port toward the rotation center can be designed with large freedom to be a suitable value or a required value without limitation of the communication hole of the middle plate.

Forming the groove and the full-open port by etching process, the valve seat can be designed more freely, and dimensional accuracy, flatness and surface roughness of components can be improved. Especially, a fine working process of the groove and the full-open port can be finished precisely.

In the detailed structure, the electric actuator is a stepping motor, and a rotor of the stepping motor is engaged with the valve body to transmit torque, and the rotating center of the valve body is arranged by engaging a center shaft supported by the middle plate with a center hole formed at the valve body, and the center hole of the valve body is tapered. Thereby, it can make assembling easily and make the valve body to be tilted swiveling against the center shaft and pushed toward the top surface of the border band by a spring.

According to the electric control valve having such structure, dispersion of parallelism and perpendicularity of the valve seat surface and the valve body against the center shaft can be absorbed by valve body swiveling. Provability of locking the valve body by biting dust can be reduced.

When the rotor is engaged with the valve body to transmit torque by inserting the projection of the rotor between two projections of the valve body, by pushing the projection of the rotor to the other of the two projections of the valve body in a direction of rotating the valve body by a spring pushing the projection of the rotor from one of the two projections of the valve body to the other thereof, looseness between the two projections of the valve body and the projection of the rotor is eliminated. Thereby, the valve body and the rotor can synchronously rotate securely, and sound noise by the looseness is reduced.

The detailed structure can be formed by that the electric actuator is a stepping motor, and a projection is formed on a bottom surface of the valve chamber as a stopper against a rotating direction of the rotor of the stepping motor, and a damping spring is mounted on the projection.

According to the electric control valve structured above, shock at a collision with the stopper is absorbed by the damping spring and a collision sound is reduced.

The invention claimed is:

1. An electric control valve, comprising:
   a valve chamber having a flat valve seat surface, on which a groove is formed, for setting a throttled flow rate variably; and
   a valve body, an end surface of which opposes to the valve seat surface, being arranged rotatably in the valve chamber;
   an electric actuator,
   wherein the valve body is rotated by the electric actuator to a predetermined position, said position determining the throttled flow rate quantitatively by the groove, characterized in that,
   the valve seat surface is provided with said groove, a band-shaped border band being provided around the groove and drawing an outline of the groove and a depression arranged around the border band, said border band projecting from the groove and the depression, and the end surface of the valve body contacts slidingly on a top surface of the border band,
   the groove extends in a circular arc shape in a rotating direction of the valve body and is a groove having a bottom, which groove has a uniform depth and a width that changes gradually in an extending direction,
   the groove communicates at a side of maximum dimension of the width to a full-open port formed on the valve seat surface, and
   the depth of the groove is equal to that of the depression arranged around the border band.

2. The electric control valve according to claim 1, wherein the full-open port is biased from a center of a joint for connecting with an outside toward a rotation center of the valve body.

3. The electric control valve according to claim 2, wherein the electric actuator is a stepping motor, and a rotor of the stepping motor is engaged with the valve body to transmit torque, and the rotating center of the valve body is arranged by engaging a center shaft supported by the middle plate with a center hole formed at the valve body, and said center hole of the valve body is tapered so as to tilt the valve body swiveling against the center shaft and pushed toward the top surface of the border band by a spring.

4. The electric control valve according to claim 2, wherein the electric actuator is a stepping motor, and a projection is formed on a bottom surface of the valve chamber as a stopper against a rotating direction of the rotor of the stepping motor, and a damping spring is mounted on the projection.

5. The electric control valve according to claim 1, wherein a bottom portion of the valve chamber is formed with a structure stacked by a bottom cover to be connected with the joint, a valve seat having the valve seat surface formed with the groove and the full-open port, and a middle plate being provided between the bottom cover and the valve seat and having a communication hole for communicating the joint and the full-open port.

6. The electric control valve according to claim 5, wherein the groove and the full-open port of the valve sear are formed by etching process.

7. The electric control valve according to claim 1, wherein the electric actuator is a stepping motor, and a rotor of the stepping motor is engaged with the valve body to transmit torque, and the rotating center of the valve body is arranged by engaging a center shaft supported by the middle plate with a center hole formed at the valve body, and said center hole of the valve body is tapered so as to tilt the valve body swiveling against the center shaft and pushed toward the top surface of the border band by a spring.

8. The electric control valve according to claim 7, wherein said rotor is engaged with said valve body to transmit torque by inserting a projection projecting from the rotor between two projections projecting from the valve body with a space in a direction of rotating the valve body, and the projection of the rotor is pushed to the other of the two projections of the valve body in the direction of rotating the valve body by a spring pushing the projection of the rotor from one of the two projections of the valve body to the other thereof.

9. The electric control valve according to claim 1 wherein the electric actuator is a stepping motor, and a projection is formed on a bottom surface of the valve chamber as a stopper against a rotating direction of the rotor of the stepping motor, and a damping spring is mounted on the projection.

10. The electric control valve according to claim 1 wherein the groove is concave.

* * * * *

UNITED STATES PATENT AND TRADEMARK OFFICE
CERTIFICATE OF CORRECTION

PATENT NO.       : 7,316,384 B2
APPLICATION NO.  : 10/545711
DATED            : January 8, 2008
INVENTOR(S)      : Itaru Sekiya et al.

It is certified that error appears in the above-identified patent and that said Letters Patent is hereby corrected as shown below:

In the patent, column 3, line 51 after "by" delete "durring" and insert --burring--

In the patent, column 4, line 31 after "The" delete "fill" and insert --full--

In the patent, column 8, line 23 after "0" delete "pules" and insert --pulses--

In the patent, column 11, line 10, claim 6 after "valve" delete "sear" and insert --seat--

Signed and Sealed this

Twenty-fifth Day of August, 2009

David J. Kappos
*Director of the United States Patent and Trademark Office*